United States Patent [19]

Shenk

[11] E Re. 31,362

[45] Reissued Aug. 30, 1983

[54] AUTOFOCUS MOVIE CAMERA HAVING PULSED TERMINAL DRIVE MEANS

[75] Inventor: Edwin K. Shenk, Westford, Mass.

[73] Assignee: Polaroid Corporation, Cambridge, Mass.

[21] Appl. No.: 366,813

[22] Filed: Apr. 8, 1982

Related U.S. Patent Documents

Reissue of:

[64] Patent No.: 4,238,143
Issued: Dec. 9, 1980
Appl. No.: 276
Filed: Jan. 2, 1979

[51] Int. Cl.[3] ..... G03B 3/10; G05B 5/01; G05B 19/29

[52] U.S. Cl. ..... 352/140; 354/195; 318/601; 318/611

[58] Field of Search ..... 354/25 R, 25 A, 25 P, 354/25 N, 31 F, 195; 352/140; 358/227; 355/56-59; 250/201; 318/16, 601, 611, 612, 614, 648, 685, 658

[56] References Cited

U.S. PATENT DOCUMENTS

| | | | |
|---|---|---|---|
| 3,370,289 | 2/1968 | Hedgcock et al. | 340/347 |
| 3,586,953 | 6/1971 | Markkanen | 318/685 |
| 3,760,252 | 9/1973 | Beery | 318/601 X |
| 3,949,287 | 4/1976 | Wagensonner et al. | 318/640 |
| 3,963,970 | 6/1976 | Satake | 318/640 |
| 4,002,405 | 1/1977 | Stahl | 354/195 X |
| 4,066,347 | 1/1978 | Wagensonner | 352/141 |
| 4,114,079 | 9/1978 | Miyakita | 318/601 |
| 4,239,354 | 12/1980 | Shenk | 354/195 X |
| 4,309,098 | 1/1982 | Shenk | 354/195 |

OTHER PUBLICATIONS

U.S. Patent Application Ser. Nos. 947,774, 965,405,277.

*Primary Examiner*—William B. Perkey
*Attorney, Agent, or Firm*—David R. Thornton

[57] ABSTRACT

The operational range of an adjustable focus lens is subdivided into a plurality of focus zones, of finite size, by a lens control system that produces a plurality of discrete signals representative of said focus zones, said control system utilizing bidirectional drive means to position the movable element of said lens to one of said focus zones from any position within said operational range in order to focus an image of a remote object at an image plane. The present invention optimally increases the focusing speed and the focusing repeatability of said control system while equalizing and minimizing the focusing error introduced into said control system resulting from the use of such focus zones with bidirectional drive means, by anticipating the arrival of said movable lens element at the desired focus zone, disabling the lens drive means for a limited period of time prior to the time that said lens element arrives at said desired focus zone, and then having said drive means provide a pulsating driving force to said movable lens element until said movable lens element reaches said desired focus zone.

13 Claims, 5 Drawing Figures

AUTOFOCUS MOVIE CAMERA HAVING PULSED TERMINAL DRIVE MEANS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an automatic focusing system for an adjustable focus lens camera in general, and to such a system having reversible drive means, in particular.

2. Description of the Prior Art

Control systems for automatically positioning the movable element of an adjustable focus lens to a desired focus position in order to properly focus an image of a remote object at the image plane of a photographic camera in response to a signal representative of the distance to said remote object, have been disclosed in the prior art. Control systems that divide the entire operational range of an adjustable focus lens into a plurality of discrete focus zones by generating a plurality of discrete signals (one discrete signal for each focus zone) in order to so focus an adjustable focus lens, have also been disclosed in the prior art.

Prior art control systems having reversible drive means are capable of automatically moving the movable element of an adjustable focus lens in either of two directions to a particular focus zone (as described above) and stopping lens element movement as soon as said lens element reaches said focus zone. If the movable lens element is stopped as soon as it reaches an appropriate focus zone, as determined by a focus zone signal corresponding to said focus zone, said lens element can be positioned to at least two different focus positions for the same focus zone signal, the particular position being dependent upon the end of the focus zone that is entered by said movable lens element. This can result in a lens element positioning differential or focusing error as large as the width of a discrete focus zone.

One fairly common technique for reducing the aforementioned focusing error is to reduce the width of each focusing zone by increasing the total number of focusing zones that collectively represent the entire adjustable focus lens operational range. While this technique does reduce focusing error as discussed above, it does so by increasing the complexity of the automatic focus control system that positions the adjustable focus lens to the appropriate focus zone. For example, increasing the number of discrete focus zones would normally increase the total number of binary coded bits in a digital control system that would be needed to define the additional focus zones for proper automatic focus control system operation. Another technique that might be utilized to reduce focusing error is a ratchet and pawl arrangement where a pawl engages and arrests the movement of a ratchet that is mounted on and rotates with the movable element of an adjustable focus lens. While this type of arrangement would reduce focusing errors of the type described above, such an arrangement often breaks down and is relatively complex and expensive.

In my U.S. Pat. No. 4,178,087, electrodynamic braking is utilized to reduce said aforementioned focusing error by arresting lens movement within a selected portion of the desired focusing zone. While this arrangement is effective at relatively low focusing speeds, the movable lens element tends to pass through or overshoot the desired focusing zone at relatively high focusing speeds which can result in damped oscillatory movement of said movable lens element within said desired focusing zone.

In my U.S. patent application Ser. No. 277 filed on an even date herewith, the above-mentioned high speed focusing zone overshooting problem is resolved by sensing the arrival of the lens at a focus zone immediately adjacent the desired focus zone and disabling the lens drive means for a limited period of time. If the adjustable focus lens is not focused to the desired focus zone during said limited period of time, said lens drive means is enabled until said lens is focused to said desired focus zone. While this arrangement increases the focusing speed of the adjustable focus lens control system, said arrangement does not have the capability of being able to repeatably position the adjustable focus lens to approximately the same relative position within all of the control system focus zones which makes the lens focusing error greater in some focus zones than it does in other focus zones.

SUMMARY OF THE INVENTION

In accordance with a preferred embodiment of the present invention, a digital control system having reversible drive means for focusing the adjustable focus lens of a cine camera is capable of repeatably focusing the movable element of said adjustable focus lens to approximately the same position within a desired focus zone, at a relatively high rate of speed, without causing said lens element to oscillate during such lens focusing. In such a control system, the entire operational range of said adjustable focus lens is divided into plurality of discrete focus zones by generating a plurality of discrete signals, one such signal for each such focus zone. When the focus zone immediately adjacent the desired focus zone is sensed by said control system, the driving force provided by said reversible drive means is disabled for a limited period of time. If the adjustable focus lens is not focused to the desired focus zone during said limited period of time, said reversible drive means is enabled such that said drive means provides a pulsating driving force to said adjustable focus lens until said lens is focused to said desired focus zone.

DESCRIPTION OF THE PREFERRED EMBODIMENTS

Figure 1:
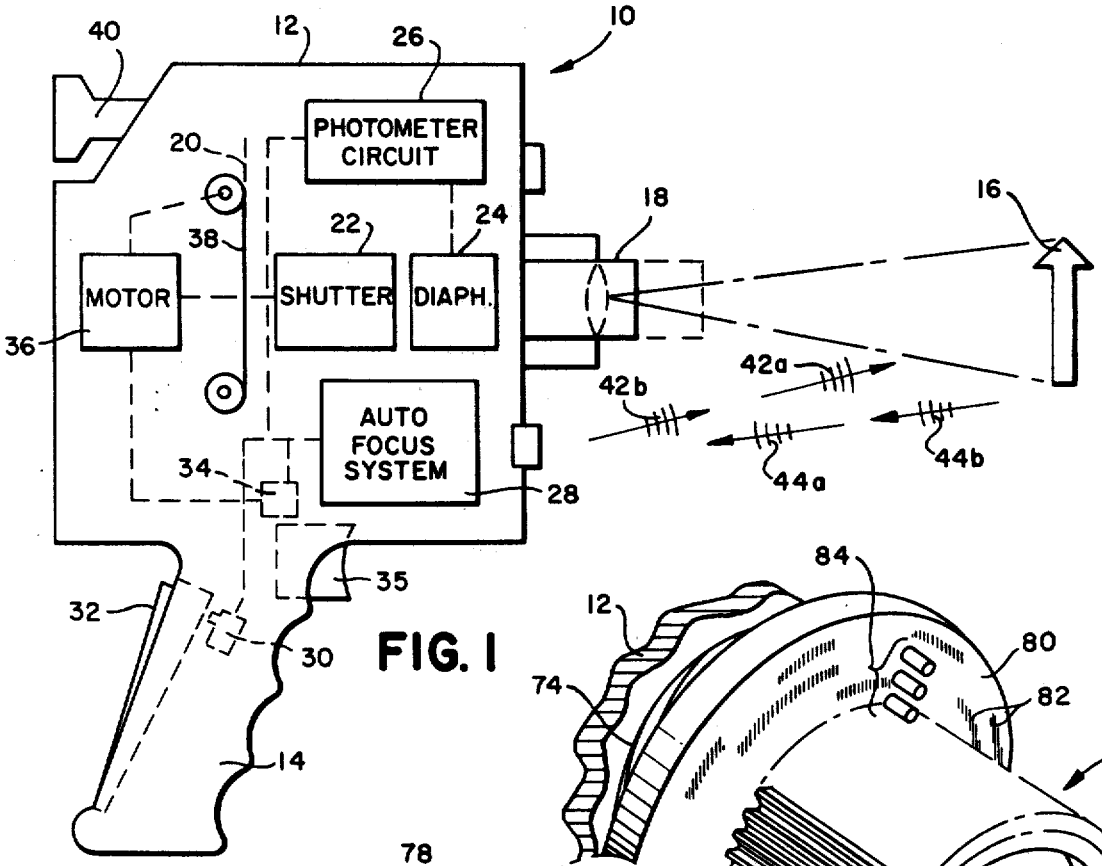
FIG. 1 is a side view, in elevation, of an adjustable focus lens motion picture camera incorporating the inventive concept of the present invention.

Referring now to the drawings and, specifically, to FIG. 1, a schematic diagram of automatic focusing camera 10 constructed in accordance with a preferred embodiment of the present invention, is depicted. Camera 10 comprises a housing 12 having handle 14 projecting from the bottom thereof by which a user holds said camera 10 to photograph subject 16 through adjustable focus lens mount 18 which directs scene light to image plane 20 when shutter mechanism 22 is operated. Diaphragm 24 associated with shutter mechanism 22, in conjunction with lens mount 18, establishes the instantaneous amount of light incident on image plane 20. The opening of diaphragm 24 is controlled by photometer circuit 26 in response to available scene light.

Mounted within said housing 12 is automatic focusing system 28 which, when activated, is responsive to the distance to subject 16 from camera 10, and to changes in said distance for adjusting the focus position of lens mount 18 in order to maintain an image of subject 16 in focus at image plane 20. Switch 30, which is mounted in camera handle 14 and is connected to an energy source (not shown), controls the operation of photometer circuit 26 and automatic focus system 28 in response to a minimum amount of pivotal movement of actuator 32 as the handle 14 is engaged by the heel of a user's hand when holding camera 10 in position to record a scene. Additionally, switch 30 couples said energy source (battery) to motor run switch 34 to permit scene recording as explained below.

Housing 12 also contains motor 36 which, when energized through motor run switch 34 by depressing trigger 35, simultaneously operates shutter 22 and a film indexing claw (not shown) which intermittently dries film 38 past an image recording station located behind shutter 22. Finally, a viewfinder 40 is provided to enable a camera user to frame the scene being filmed.

In the operation of camera 10, the user grasps handle 14 and frames subject 16 by means of viewfinder 40. As the user holds handle 14, switch 30 is closed by the movement of actuator 32 thereby powering photometer circuit 26 and automatic focus system 28. Photometer circuit 26 establishes the proper diaphragm opening in accordance with the amount of light in the scene being photographed while automatic focus system 28 ultrasonically determines the distance to subject 16 and then focuses adjustable focus lens mount 18 such that the lens system in said lens mount 18 focuses as in-focus image of subject 16 at image plane 20 when shutter 22 is activated to the open position. The distance to subject 16 is determined by measuring the time it takes for an ultrasonic burst of energy to travel from autofocus system 28 to subject 16 and to be reflected back to said autofocus system 28 from said subject 16. Reference numerals 42a and 42b designate sequential ultrasonic bursts of energy being transmitted toward subject 16 and reference numerals 44a and 44b designate the reflection of these ultrasonic bursts of energy from subject 16 toward autofocus system 28. In this particular ultrasonic focusing system, an ultrasonic burst of energy is transmitted and an echo of said transmitted burst of ultrasonic energy is received before a subsequent burst of range determining ultrasonic energy is transmitted. The ultrasonic range finder portion of autofocus system 28 is described in greater detail in my copending U.S. patent application Ser. No. 916,114.

As discussed above, autofocus system 28 determines the time interval between the transmission of an ultrasonic burst of energy 42a and the return of its echo 44a for the purpose of determining the distance to subject 16 from camera 10. Having established this distance, system 28, when permitted to do so, moves lens mount 18 toward a focus position in which an image of subject 16 will be in focus at focal plane 20 when shutter 22 is activated. As mentioned briefly above, activation of shutter 22 is selectively carried out when the user depresses trigger 35 thereby closing switch 34 and powering motor 36. Autofocus system 28 remains in operation so long as the user maintains his grasp of the handle 14, and is effective to continuously determine subject range and to cause lens mount 18 to track changes in subject distance both prior to and during filming.

Figure 2:
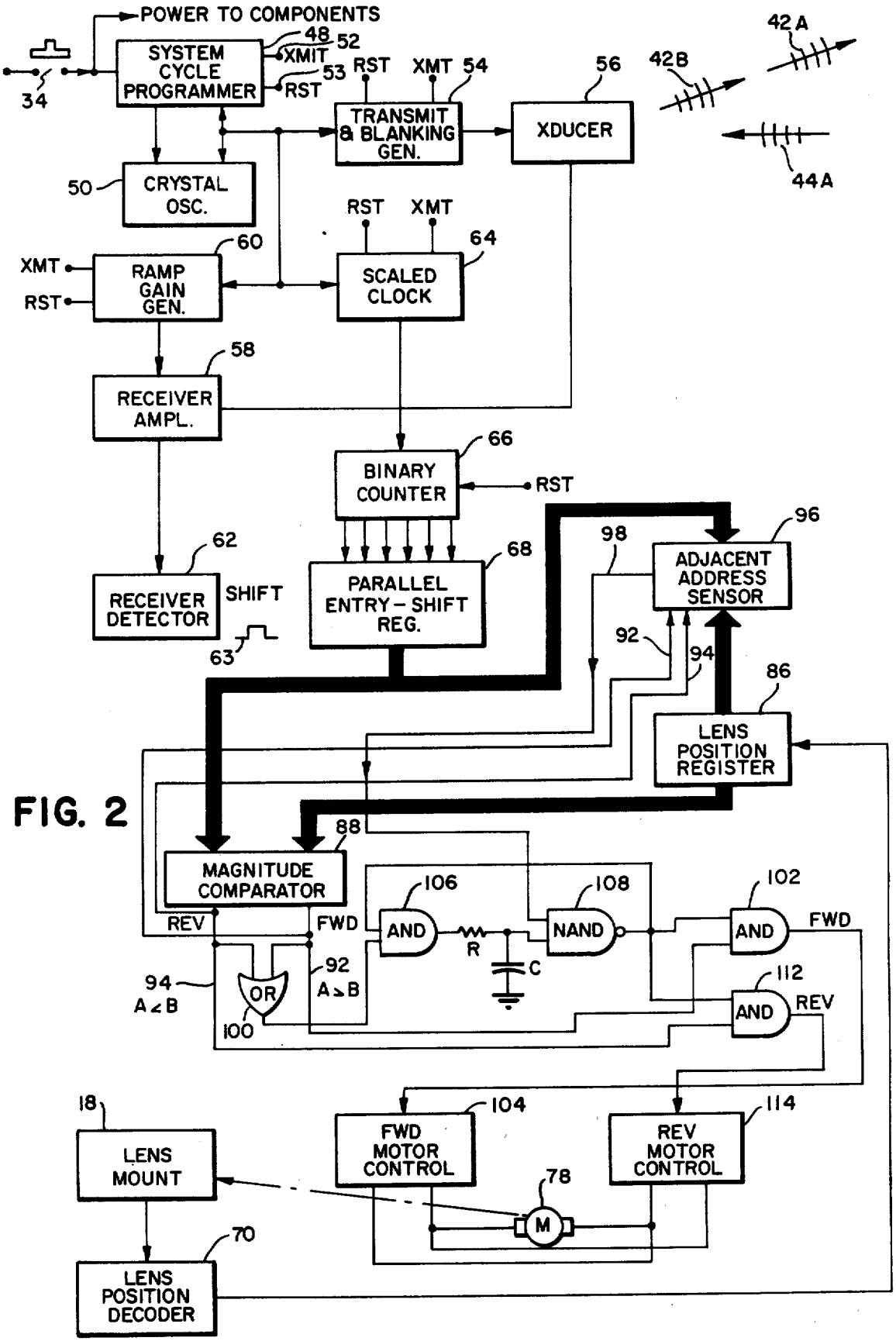
FIG. 2 is a block diagram of a preferred embodiment of the relatively high speed digital control system of the present invention.

Certain details of automatic focus system 28 are shown in FIG. 2, to which reference is now made. When switch 34 is closed, power is applied to the components of autofocus system 28 (FIG. 1) which causes system cycle programmer 48 to divide-down the high frequency output of oscillator 50 into a transmit and reset pulse train having the same pulse repetition frequency, but shifted in phase. Transmit pulses produced at output 52 are designated XMT. The reset pulses produced at output 53 and designated RST, are the same as the XMT pulses, but are delayed with respect to the XMT pulses by about 100 ms, which is greater than the round trip time for sonic energy, under normal conditions of temperature and pressure, for subjects at a distance of about 24 feet from the camera 10 (FIG. 1) which represents the hyperfocal lens position of the lens system mounted in lens mount 18 (FIG. 1). This arrangement will allow any echo from a subject within 24 feet of said camera to be received by system 28 in the time interval between successive RST reset pulses.

Transmit and blanking generator 54, to which the XMT pulses and the output of oscillator 50 are applied, operates similar to the corresponding component in the ultrasonic ranging system disclosed in copending application Ser. No. 840,802, filed Nov. 11, 1977, in the name of JUERG MUGGLI, which causes transducer 56 to transmit periodic ultrasonic bursts of energy, two of which are illustrated at 42a and 42b. An echo from a subject due to ultrasonic burst of energy 42a, indicated at 44a, is received by transducer 56 where the echo, in the form of an electrical signal, is routed to receiver amplifier 58 in the manner described in the above-mentioned MUGGLI application. Amplifier 58 has a ramp gain characteristic controlled by ramp gain generator 60 to increase the sensitivity of autofocus system 28 to distant subjects. The output of amplifier 58 is detected by receiver detector 62 to produce an echo pulse 63 such that the time between a transmit pulse and its associated echo pulse is proportional to the distance between a subject and camera 10.

This above-noted time interval is utilized in conjunction with scaled clock 64 to establish a number representative of the desired focus position for lens mount 18. The output of scaled clock 64 is a train of pulses whose pulse repetition frequency varies with time in accordance with the derivative of the lens/subject function of the lens system associated with lens mount 18. The output of scaled clock 64 is integrated by accumulating the pulses produced by said scaled clock, in binary counter 66: the contents of counter 66 at any instant in time represents the integral of the time derivative of the lens/subject function evaluated from the time of transmit pulse XMT to said instant in time. Consequently, the contents of counter 66, when echo pulse 63 occurs, is a definite integral of the time derivative of the lens/-subject function of the lens system associated with lens mount 18, which is a number representing the desired focus position of said lens mount 18 for a subject whose distance is determined by the time interval between transmit pulse XMT and echo pulse 63.

By means of receiver detector 62, echo pulse 63 triggers parallel entry-shift register 68 causing the shifting of the contents of counter 66, at the instant of echo pulse 63, into shift register 68. Shortly after echo pulse 63 occurs, reset pulse RST appears at output 53 of system cycle programmer 48 thereby resetting scaled clock 64, binary counter 66, ramp gain generator 60 and transmit and blanking generator 54. The condition of autofocus system 28 is now such that upon the generation of the next ultrasonic burst of energy in response to transmit and blanking generator 54 and the next transmit pulse XMT from system cycle programmer 48, the cycle of operation described above will be repeated so that, upon the generation of the next echo pulse 63, the contents of counter 66 will again be shifted into register 68. As a consequence, the number in register 68 repeatedly varies in response to changes in subject distance at a rate dependent upon the pulse repetition rate of transmit pulse XMT.

Figure 3:
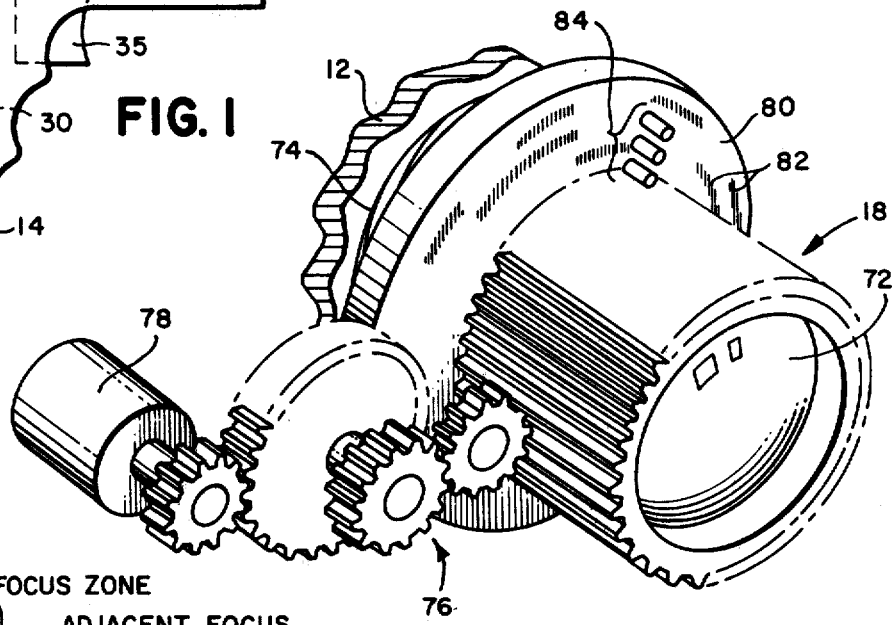
FIG. 3 is a perspective view of the adjustable focus lens, lens mount and reversible lens drive motor of the motion picture camera depicted in FIG. 1 showing the means for encoding the angular and therefore the focus position of the movable element of said adjustable focus lens.

For determining the actual position of lens mount 18, lens position decoder 70 is provided and is described in detail with respect to FIG. 3. Reference is now made to FIG. 3 which shows the preferred form of lens position decoder 70. As shown in FIG. 3, lens mount 18 carrying objective lens 72 is rotatably mounted on threaded member 74 carried by camera housing 12 so that rotational movement of lens mount 18 causes axial displacement of lens 72. Actually, the pitch of member 74 is selected such that considerably less than 360° is required to displace lens 72 from its extreme close-up axial position to its infinity or hyperfocal axial position. In order to rotate lens mount 18, a gear train 76 is interposed between the motor 78 and the gear teeth carried by the periphery of the mount for objective lens 72. A slip clutch connection (not shown) is interposed between motor 78 and lens mount 18 to permit overrunning of the motor in the event of a jam or engagement of the lens mount with an axial movement limiting stop at either end of lens mount travel. Projecting from and rotatable with the movable portion of lens mount 18 is encoder disc 80, carrying shaft encoding indicia 82 in the form of binary coded slots that pass completely through said disc 80. Encoding indicia 82 are preferably in the form of a gray code. However, for ease of description, a standard three-bit binary code is utilized. Operatively associated with indicia 82 are three photocells 84 and three light sources (not shown). The light path between a light source and its associated photocell is blocked and unblocked by slotted encoder disc 80 as said disc is rotated through said light path. The output of each photocell provides one bit of information on the angular and therefore the axial position of the movable element of lens mount 18. The slots in disc 80 and their relationship to photocells 84 are shown in greater detail in FIG. 4A.

Figure 4B:
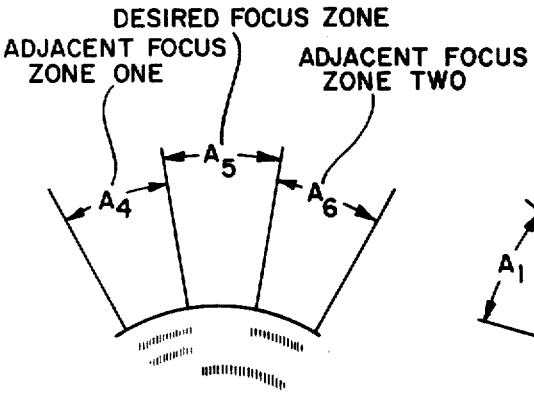
FIG. 4B is a detailed view of three of the discrete focus zones depicted in FIG. 4A.
Figure 4A:
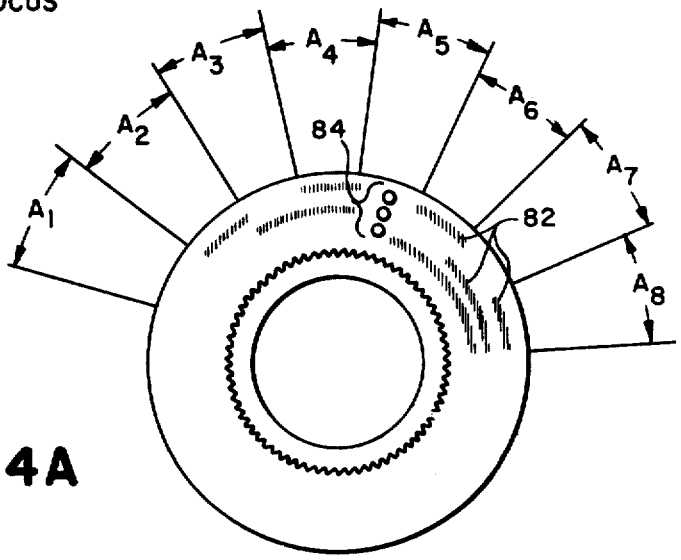
FIG. 4A is a front elevational view of the lens mount for the movable element of the adjustable focus lens depicted in FIG. 3, showing a three bit binary code on a disc projecting from said lens mount, said code defining eight discrete focus zones of said adjustable focus lens.

FIG. 4A is a front elevational view of the movable element in lens mount 18 of the adjustable focus lens depicted in FIG. 3, showing a three-bit binary code on encoder disc 80 projecting from said lens mount, said code defining eight address locations or discrete focus zones of said adjustable focus lens. The eight focus zones are designated $A_1$ thru $A_8$, said focus zones corresponding to the numbers 0 through 7, respectively, in binary code. The $A_1$ thru $A_8$ focus zones are shown extending over 160° of movable lens element rotation. However, this range of angular movement is by design choice and said movement range could extend to 360° or substantially less than the 160° shown.

Turning again to FIG. 2, the output of lens position decoder 70 is applied to lens position register 86 which constitutes means responsive to the position of said lens mount 18 for generating a number representative of the actual position of said lens mount. Continuing now with the operation of the embodiment of FIG. 2, parallel entry/shift register 68 is a first register of autofocus system 28 (FIG. 1) and stores a number representative of the desired focus position for lens mount 18, the contents of this first register varying in response to changes in subject distance at a rate dependent on the pulse repetition rate of the transmit pulses as previously discussed. Lens position register 86 constitutes a second register of autofocus system 28 (FIG. 1) which stores a number representative of the actual position of lens mount 18, the contents of register 86 varying in response to changes in lens mount 18 position at a rate determined by the rate of change of lens mount 18 position. The rate of change of the contents of register 86 is thus independent of the rate at which the contents of register 68 are updated.

The contents of registers 68 and 86 are compared in magnitude comparator 88 to determine, on a continuous basis, which register contains the larger number. Since each register number is based on the same reference (i.e., the desired focus position and the actual lens position are measured from the same reference point), the contents of the registers will be equal when the actual position of lens mount 18 corresponds to the desired focus position for said lens mount 18. When the contents of one register exceeds the other, the actual position of lens mount 18 will be displaced from its last focus position by an amount equal to the difference between the contents of each such register. Whether the actual position of lens mount 18 is on one side or the other of the desired focus position will depend upon which register contains the larger number.

Comparator 88 has forward and reverse output terminals 92 and 94, respectively. A signal appears on first terminal 92 only when the number in first register 68 exceeds the number in second register 86. If the numbers in the registers are designated A and B, then a signal will appear on terminal 92 when $A > B$. Ordinarily, a signal will appear on second terminal 94 only when the reverse relationship between the magnitudes occurs, namely $B > A$.

In a manner similar to magnitude comparator 88, the contents of registers 68 and 86 are compared in adjacent address sensor 96, on a continuous basis, to determine when a focus zone immediately adjacent the desired focus zone has been sensed by photocells 84 (FIGS. 1 and 3). Forward and reverse signals 92 and 94 from the output of magnitude comparator 88 enable adjacent address sensor 96 to determine which of two possible focus zones adjacent a desired focus zone is being sensed by photocells 84. For example, in FIG. 4B, which is a detailed view of three of the focus zones depicted in FIG. 4A, if focus zone $A_5$ was the desired focus zone, focus zones $A_4$ and $A_6$ are two focus zones that are immediately adjacent said focus zone $A_5$ and for proper implementation of the inventive concept of the present invention, adjacent address sensor 96 must know which of the two possible adjacent focus zones is the actual adjacent focus zone and this particular information is provided by forward and reverse drive signals 92 and 94 appearing at the output of magnitude comparator 88. Adjacent address signal 98 appears at the output of adjacent address sensor 96 when photocells 84 sense the proper focus zone adjacent a desired focus zone.

In operation, focus forward signal 92 appearing at the output of magnitude comparator 88 will appear at the input to OR gate 100 and at the input to AND gate 102. If adjacent address sensor 96 does not produce adjacent address signal 98 at its output, AND gate 102 will be satisfied and a drive forward signal will be sent to forward motor control 104 which will cause lens drive motor 78 and lens mount 18 to be driven in the forward direction toward a desired focus zone. In addition to satisfying gate 102, focus forward signal 92 also satisfies OR gate 100 as well as AND gate 106 because the other required input to AND gate 106 is being supplied by conducting NAND gate 108. When AND gate 106 is satisfied, timing capacitor C charges up to the output voltage of AND gate 106, thereby providing one of the two inputs to NAND gate 108. When adjacent address sensor 96 senses the adjacent focus zone and produces adjacent address signal 98 at its output, said signal appears at the input to NAND gate 108, causing said NAND gate 108 to open because of capacitor C being fully charged, which causes AND gate 102 to open, which terminates the drive forward signal to forward motor control 104 and the driving force being supplied by motor 78, but allowing inertial forces to continue to move lens amount 18 toward the desired focus zone. When adjacent address signal 98 appears at the input of NAND gate 108, it causes said NAND gate 108 to open which, in turn, causes AND gate 106 to open. When AND gate 106 opens, the voltage at its output falls, causing the voltage on capacitor C to fall, which again renders NAND gate 108 and AND gate 102 conductive, which again causes forward motor control 104 to energize motor 78, causing said motor 78 to again drive lens mount 18 toward the desired focus zone. Feeding back the output voltage of NAND gate 108 to the input of AND gate 106 causes a train of voltage pulses to appear across capacitor C and one input to NAND gate 108. These voltages pulses cause NAND gate 108 to be gated on and off which, in turn, causes AND gate 102 to be gated on and off. Gating AND gate 102 on and off in this manner causes forward motor control 104 to energize motor 78 in accordance with the voltage pulses being supplid to AND gate 102 by NAND gate 108. Once the desired focus zone is reached, focus forward signal 92 is disabled, which opens AND gate 102 and terminates the pulsating motor force being supplied by drive motor 78. The characteristics of the voltage pulses appearing across capacitor C are primarily determined by the resistance value of resistor R and the capacitance value of capacitor C.

Similarly, focus reverse signal 94 appearing at the output of magnitude comparator 88 will appear at the input to OR gate 100 and at the input to AND gate 112. If adjacent address sensor 96 does not produce adjacent address signal 98 at its output, AND gate 112 will be satisfied, because NAND gate 108 will be conducting, and a drive reverse signal will be sent to reverse motor control 114, which will cause lens drive motor 78 and lens mount 18 to be driven in the reverse direction toward a desired focus zone. In addition to satisfying gate 112, focus reverse signal 94 also satisfies OR gate 100 as well as AND gate 106 because the other required input to AND gate 106 is being supplied by conducting NAND gate 108. When AND gate 106 is satisfied, timing capacitor C charges up to the output voltage of AND gate 106, thereby providing one of the two inputs to NAND gate 108. When adjacent address sensor 96 senses the adjacent focus zone and produces adjacent address signal 98 at its output, said signal appears at the input to NAND gate 108, causing said NAND gate 108 to open because of capacitor C being fully charged, which causes AND gate 112 to open, which terminates the drive reverse signal to reverse motor control 114 and the driving force being supplied by motor 78, but allowing inertial forces to continue to move lens mount 18 toward the desired focus zone. When adjacent address signal 98 appears at the input of NAND gate 108, it causes said NAND gate 108 to open which, in turn, causes AND gate 106 to open. When AND gate 106 opens, the voltage at its outputs falls, causing the voltage on capacitor C to fall, which again renders NAND gate 108 and AND gate 112 conductive, which again causes [forward] *reverse* motor control 114 to energize motor 78, causing said motor 78 to again drive lens mount 18 toward the desired focus zone. Feeding back the output voltage of NAND gate 108 to the input of AND gate 106, causes a train of voltage pulses to appear across capacitor C and one input to NAND gate 108. These voltage pulses cause NAND gate 108 to be gated on and off which, in turn, causes AND gate 112 to be gated on and off. Gating AND gate 112 on and off in this manner causes [forward] *reverse* motor control 114 to energize motor 78 in accordance with the voltage pulses being supplied to AND gate 112 by said NAND gate 108. Once the desired focus zone is reached, focus reverse signal 94 is disabled, which opens AND gate 112 and terminates the pulsating motor force being supplied by drive motor 78.

By sensing the arrival of the adjustable focus lens at an adjacent focus zone, de-energizing the lens drive means when said adjacent focus zone is reached and [the] *then* continuously pulsing said drive means until said lens reaches the desired focus zone, the focus control system can repeatably focus the adjustable focus lens to approximately the same relative position within any focus zone at a relatively high rate of speed.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. In an autofocusing camera having a displaceable lens, means for determining subject distance, control means energizeable for displacing said lens to a location selected in accordance with said distance determining means to thereby focus an image of the subject on the camera focal plane, said control means including encoder means responsive to lens displacement for producing a plurality of discrete signals, each representative of displacement of said lens to within a respective positional zone of said lens;

and said control means including means for terminating displacement of said lens within a positional zone selected in accordance with said distance determining means, the improvement comprising:

that said displacement terminating means includes, means for generating a signal representative of said lens at the adjacent positional zone immediately before said selected positional zone; and means for regulating said control means such that it provides a constant force to said displaceable lens before it is positioned to a positional zone immediately adjacent said selected positional zone and provides a pulsating force to said displaceable lens while said lens is positioned within said adjacent positional zone.

2. The apparatus of claim 1, wherein said pulsating force regulating means includes a resistor and capacitor pulse forming network and the output of said network is fed back into its input.

3. The apparatus of claim 1, wherein all of the pulses produced by said pulsating force drive means are of uniform amplitude and width.

4. The apparatus of claim 1, wherein the length of time of a force pulse and the time between adjacent force pulses are equal.

5. The apparatus of claim 1, wherein said adjacent zone signal generating means includes means for determining the adjacent positional zone immediately before said selected positional zone.

6. In a photographic camera of the type having, means for selectively coupling said camera to a source of energy, an image plane, an adjustable focus lens mounted for displacement over a given operational range where it serves to focus images of subjects positioned within a range of subject distances at said image plane, means for producing a signal indicative of the position of a particular subject within said range of subject distances, means for producing a plurality of discrete focus zone signals that correspond to a plurality of focus zones, said focus zones representing the entire focusing range of said adjustable focus lens, drive means for effecting movement of said lens from either of two directions to a desired focus zone to focus an image of a particular subject at said image plane, the improvement comprising:

means for generating a signal representative of said lens at the adjacent focus zone immediately before said particular focus zone; and means for regulating said drive means such that it provides a constant force to said adjustable focus lens before it is positioned to a positional zone immediately adjacent said selected positional zone and provides a pulsating force to said adjustable focus lens while said lens is positioned within said adjacent positional zone.

7. The apparatus of claim 6, wherein said pulsating force regulating means includes a resistor and capacitor pulse forming network and the output of said network is fed back into its input.

8. The apparatus of claim 6, wherein all of the pulses produced by said pulsating force drive means are of uniform amplitude and width.

9. The apparatus of claim 6, wherein the length of time of a force pulse and the time between adjacent force pulses are equal.

10. The apparatus of claim 6, wherein said adjacent zone signal generating means includes means for determining the adjacent positional zone immediately before said selected positional zone.

*11. An autofocus camera comprising:*

*means for determining subject distance; an adjustable lens displaceable for focusing an image of the subject on the focal plane of the camera; drive means for displacing the lens; and control means for controlling said drive means to provide a relatively constant driving force to said lens before it reaches a position in advance of the focal position desired in correlation with the determined subject distance, and for thereafter providing a pulsating driving force to said lens until said lens reaches said desired focal position.*

*12. The camera of claim 11 wherein the control means includes means for disabling said drive means for a limited period of time following provision of said constant driving force, and thereafter providing said pulsating driving force only if said lens has not reached said desired zone within said limited period of time.*

*13. The camera of claim 12 wherein the operational range of said lens is divided into a plurality of focus zones, and said control means includes means for controlling said drive means to provide said relatively constant driving force to said lens before it reaches a zone adjacent the focal zone desired in correlation with the determined subject distance and for thereafter providing a pulsating driving force to said lens until said lens reaches said desired focal zone.*

* * * * *